United States Patent

Menke

[15] 3,662,344

[45] May 9, 1972

[54] AUTOMATIC PHONOGRAPH WITH PIN MEMORY UNIT AND CAM READOUT UNIT

[72] Inventor: Wilhelm Menke, Bingen (Rhine), Germany

[73] Assignee: NSM Apparatebau GmbH, Bingen (Rhine), Germany

[22] Filed: Sept. 24, 1970

[21] Appl. No.: 75,162

[52] U.S. Cl. ..................................................340/162, 274/10

[51] Int. Cl. ........................................G11b 15/00, H04q 3/00

[58] Field of Search .........................340/162; 274/10 C, 10 D

[56] References Cited

UNITED STATES PATENTS 3,030,116 4/1962 Rockola ...............................274/10 C

*Primary Examiner*—Donald J. Yusko

*Attorney*—Anderson, Luedeka, Fitch, Even & Tabin

[57] ABSTRACT

An automatic phonograph includes a record magazine and a carriage mounted for movement relative to the record magazine and having means for removing an individual record from the magazine, clamping the record to a turntable, playing the record, and returning the record to the magazine. Record selection means enable the operator to select sides of particular records for the playing thereof. To store and read out information concerning the selected records, there are provided a memory unit, a readout unit and a circuit actuable by the readout unit to align the carriage serially opposite selected records. The memory unit includes a plurality of pins corresponding to the sides of records and which are actuated in response to a signal from the record selection means and a cam track. The readout unit is mounted on the carriage and includes a cam follower adapted to ride on the cam track of the memory unit and a contact member on a sensing lever operatively associated with the cam follower. The contact member is adapted to engage an actuated pin to complete the circuit so that the carriage is aligned with the record corresponding to the pin in the actuated position.

13 Claims, 8 Drawing Figures

Inventor
Wilhelm Menke

Anderson, Luedeka, Fitch, Even & Tabin
Attys.

AUTOMATIC PHONOGRAPH WITH PIN MEMORY UNIT AND CAM READOUT UNIT

The present invention relates to an automatic phonograph and, more particularly, to means for storing and reading out information from the record selection means of an automatic phonograph.

One type of automatic phonograph conventionally includes a record magazine adapted to hold a plurality of records, each in an upright position and having a horizontal axis, and a carriage mounted for horizontal movement relative to the record magazine and having means for removing an individual record from the magazine, clamping the record to a turntable, playing the record and returning the record to the magazine. Record selection means enabling the operator to select a side of a particular record for the playing thereof is also provided. In such an automatic phonograph, it is desirable to provide means for storing information from the record selection means concerning the selection of a quantity of records which have been chosen contemporaneously by the operator for playing. This information must be read from the storage means serially as the selected records are played.

Although memory and readout units for automatic phonographs have heretofore been devised, these units are frequently of a complicated nature. For example, some of these units require one or more magnetic or electro-magnetic elements for each side of each record which can be selected for playing to either store the selected information or to read the stored information.

Accordingly, an object of the present invention is to provide an improved automatic phonograph having means for storing and reading out information from the record selection means.

Another object of the invention is to provide an improved automatic phonograph having memory and readout units which are relatively simple in operation.

A further object of the invention is to provide an improved memory unit for an automatic phonograph which permits the reselection of a record for play during the playing thereof.

These and other objects of the invention will become apparent upon consideration of the following detailed description and accompanying drawing, in which.

Figure 1:
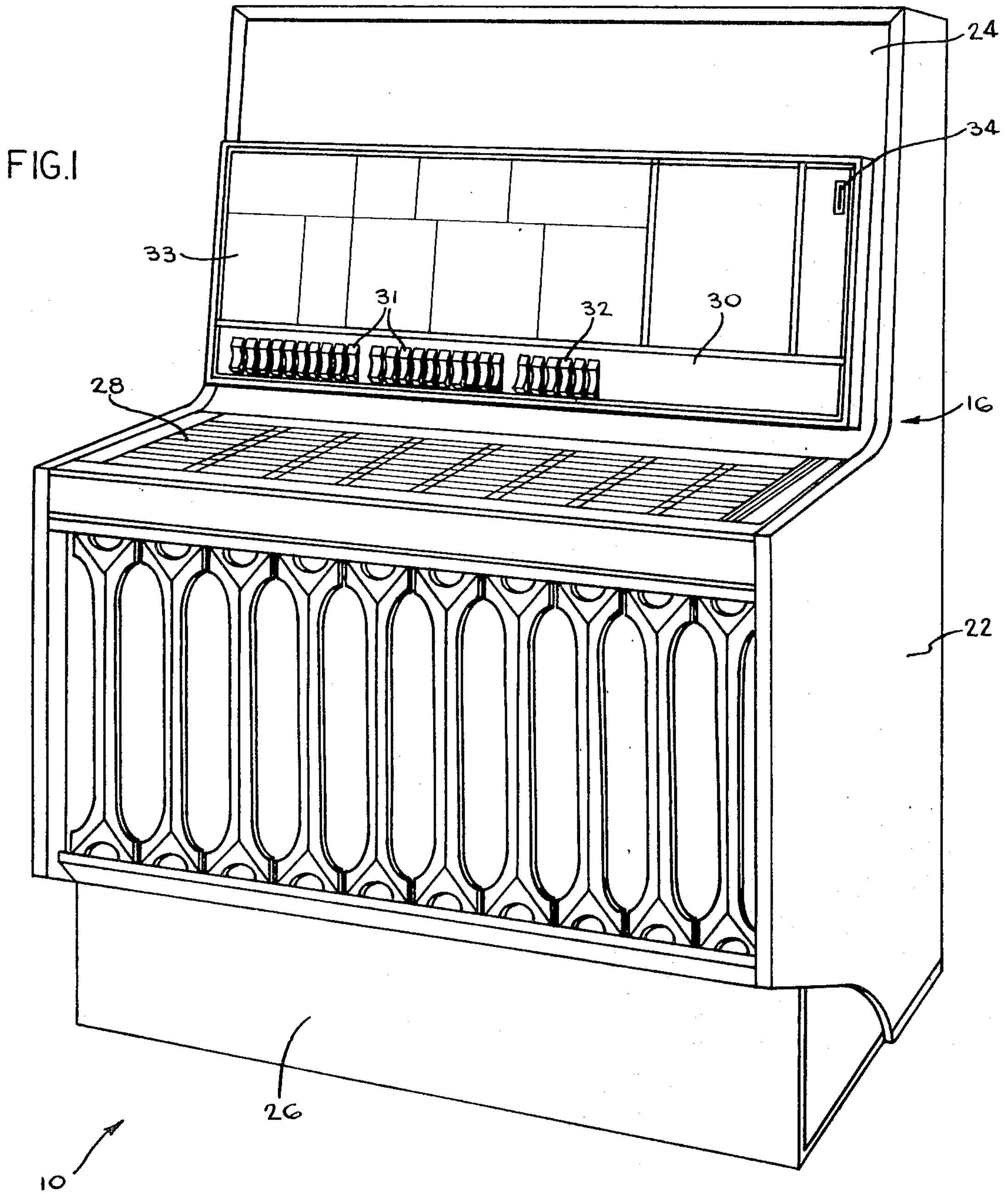
FIG. 1 is a perspective view of the exterior elements of an automatic phonograph.

Generally, and with reference to the figures of the drawing, there is shown an automatic phonograph generally designated by the reference numeral 10. As shown in FIG. 2, the automatic phonograph 10 includes a record magazine 12 adapted to hold a plurality of records, each in an upright position and having coincident horizontal axes. A carriage and playing unit 14 is mounted for horizontal movement relative to the record magazine 12 and has means for removing an individual record from the magazine, clamping the record to a turntable, playing the record, and returning the record to the magazine. Record selection means 16 (FIG. 1) enable the operator to select sides of particular records for the playing thereof.

A memory unit 18 and a readout unit 20 provides means for storing and reading out information from the record selection means 16 concerning the sides of records selected to be played. The readout unit 20 actuates a circuit to align the carriage and playing unit 14 serially opposite the selected records for the playing thereof.

Figures 2, 8:
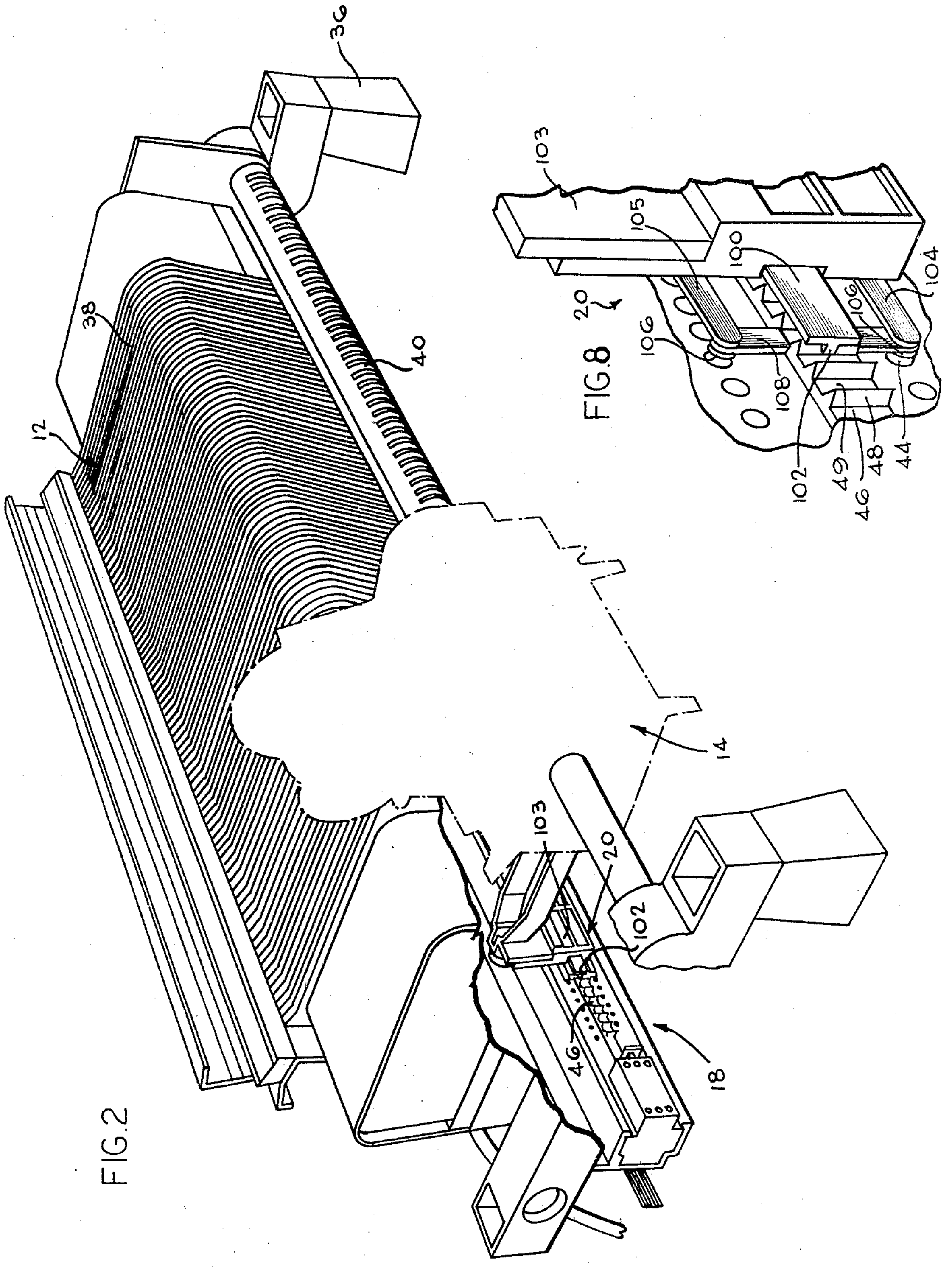
FIG. 2 is a perspective view of a record magazine for use in the automatic phonograph, partially broken away to show means for storing and reading out information concerning selected records, and showing carriage and playing means in phantom lines.
FIG. 8 is an enlarged perspective view of a readout unit useful in the present automatic phonograph.

More particularly, and with particular reference to FIG. 1 of the drawing, the automatic phonograph 10 (as it appears from its exterior) is shown having a cabinet 22 of any suitable functional and esthetic design. Within the cabinet 22, there is mounted a pair of speakers 24 and 26 for mechanically reproducing the sound recorded on the records played. The record selection means 16 is provided and includes a program guide 28 and a keyboard 30 having a plurality of keys thereon in two groups of keys 31 and 32, which when chosen in combination, allow the selection of particular sides of records to be played. The manner in which the keys are chosen to select the desired sides of records will be explained in more detail below. In a commercial embodiment of the automatic phonograph 10, a display window 33 is provided for attracting the operator to particular selections and a coin mechanism terminating in a coin entry 34 is provided so that the selections may be played only upon the insertion of coins in a specified, predetermined amount into the coin entry 34 of the coin mechanism.

Turning now to FIG. 2 of the drawing, there can be seen the interior elements of the automatic phonograph mechanism. The record magazine 12 for storing a quantity of records is mounted upon a stand 36 and includes a plurality of dividers 38 which separate the magazine into individual compartments such that a plurality of records may be disposed therein in upright position. Preferably, the magazine 12 is located such that the records have coincident horizontal axes. A horizontally disposed gear rack 40 is mounted on the stand 36 adjacent one edge of the record magazine 12. The carriage and playing unit 14 is mounted for movement relative to the record magazine 12 upon the gear rack 40. It should be apparent that other mechanisms for moving the unit 14 could also be employed. Preferably, the carriage and playing unit 14 comprises means for removing a selected record from the magazine, a turntable, means for clamping the record to the turntable, a tone arm with a cartridge having plural needles therein for playing the records, means for returning the played records to the magazine, and a suitable drive motor, all of which are conventional in the art. Upon an appropriate signal from the record selection means 16, the carriage and playing unit 14 moves along the gear rack 40 to a position adjacent the selected record within the record magazine 12. The carriage and playing unit 14 then removes the individual record from the magazine, clamps the record to the turntable, plays the record and returns the record to the magazine.

Figure 3:
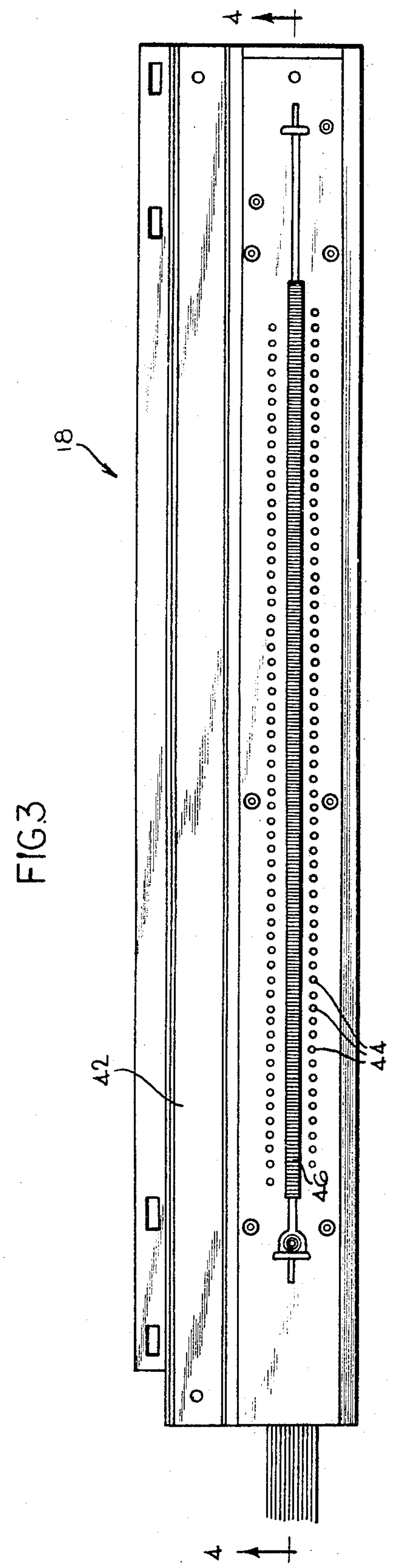
FIG. 3 is a side elevational view of a memory unit useful in the automatic phonograph.
Figures 4, 7:
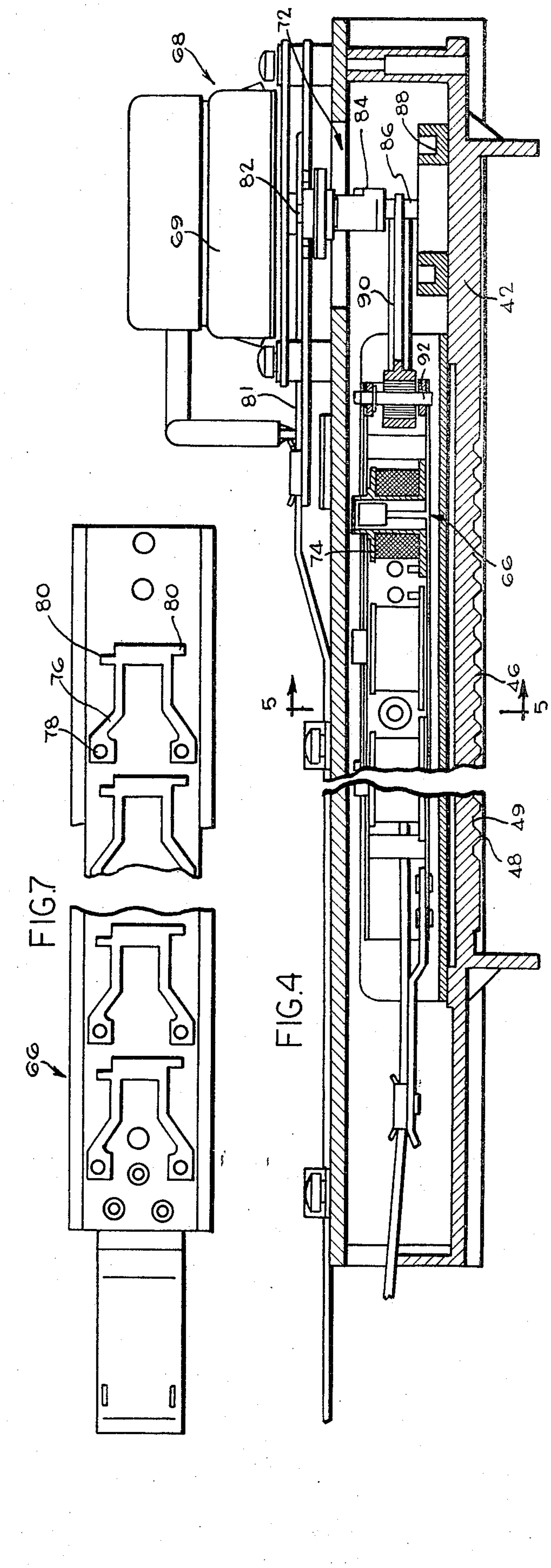
FIG. 4 is a broken cross-sectional view taken along the line 4—4 in FIG. 3.
FIG. 7 is a broken side elevational view of a portion of the memory unit of the automatic phonograph.

The memory unit 18 for retaining information concerning the records selected to be played until the records selected have been removed for play by the carriage and playing unit 14 is mounted beneath the record magazine 12 and substantially parallel to the direction of movement of the carriage and playing unit 14 along the gear rack 40. The memory unit 18 is shown in detail in FIGS. 3, 4 and 5. There it can be seen that the memory unit 18 comprises a housing 42 which is relatively elongated and extends along the entire length of the magazine 12. A U-shaped supporting member 43 holds the memory unit housing 42 adjacent the magazine 12 and the carriage and playing unit 14. A plurality of cylindrical pins 44 are disposed within the housing each of the pins corresponding to one side of each record contained in the magazine. The pins 44 are adapted to be moved from a non-actuated position substantially within the housing to an actuated position in response to a signal from the record selection means 16. Hence, the actuated pins serve as a "memory" of therecords selected by the operator. A cam track 46 is mounted upon the housing 42 adjacent the pins 44 for a purpose which will be more fully explained below. The plurality of pins 44 extend along the length of the memory unit housing 42 in staggered relationship relative to the cam track 46; pairs of pins corresponding to the two sides of each record contained in the record magazine 12 are separated by the cam track 46. As shown in FIG. 4, the cam track 46 comprises an elongated toothed rack, the individual teeth 48 of which are disposed at 45° angles to the plane of the portion of the housing 42 on which the track is located. The pins 44 are disposed adjacent the cam track 46 such that each tooth corresponds to a record compartment in the magazine and each pin is positioned adjacent the recessed portion 49 between adjacent teeth 48.

Figure 5:
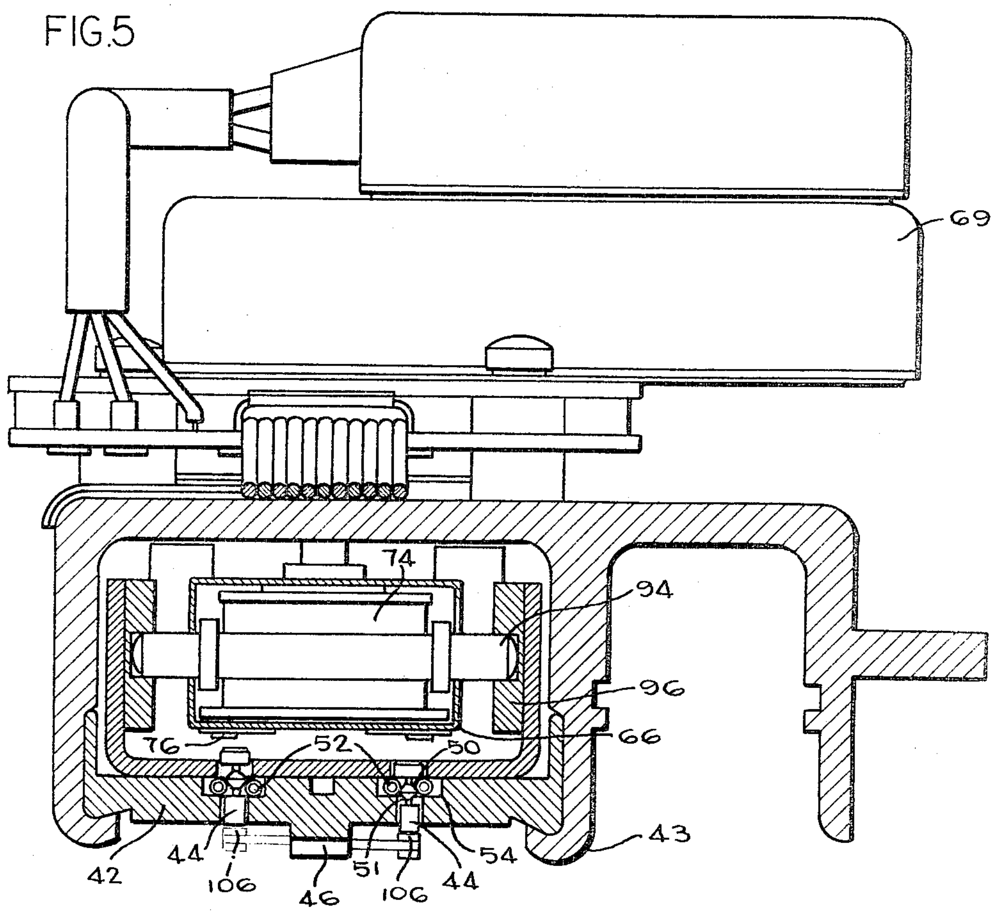
FIG. 5 is an enlarged cross-sectional view taken along the line 5—5 in FIG. 4.
Figure 6:
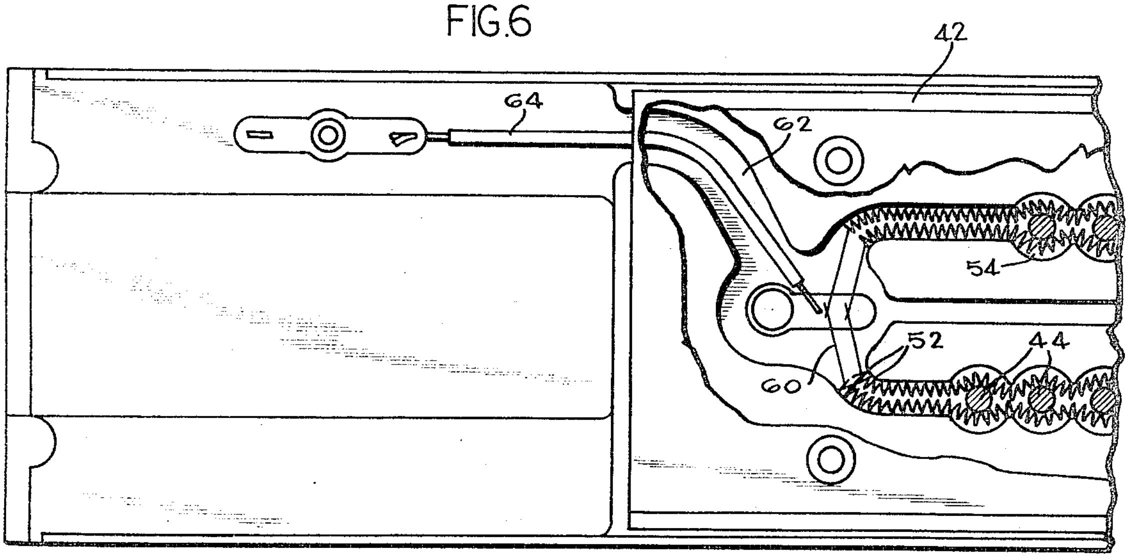
FIG. 6 is an enlarged side elevational view of a portion of the memory unit shown in FIG. 3 but partially broken away.

The preferred manner in which the pins 44 are held within the memory unit housing 42 so that the pins can be actuated when desired is illustrated in FIGS. 5 and 6. To this end, each of the cylindrical pins 44 has two circular grooves 50 and 51 formed about the periphery thereof. A pair of longitudinally extending coil springs 52 are mounted within a longitudinally extending recess 54 adjacent each row of the plurality of pins 44 on each side of the cam track 46. The springs 52 are disposed in pairs so that the cylindrical pins 44 can be located therebetween. The springs 52 normally are disposed within the outermost groove 51 in each pin 44. Thus, the pins 44 are yieldably maintained in their non-actuated position by the urging of the springs 52 located within the grooves 51 on either side of each pin. Other methods of containing the pins 44 either in actuated or non-actuated position could also be utilized. In this position, the upper surface of each pin 44 is substantially flush with the surface of the housing 42 adjacent the cam track 46. When it is desired to place an individual pin in its actuated position, the pin 44 is urged against the force of the pair of springs 52 so that the springs enter into the groove 50 near the innermost end of the pin. As shown in FIG. 5, the left-hand pin is in its non-actuated position and the right-hand pin is in its actuated position. The pins 44 which are in their actuated position serve as a "memory" of the selections chosen by the operator through manipulating the keys 31 and 32 of the record selection means 16.

The springs 52 have electrical leads 60 extending outwardly from the ends thereof. These leads 60 extend through a passage 62 in the memory unit housing 42 and join a connecting wire 64 to form a complete electrical circuit between each pin 44 and the carriage and playing unit 14 when that pin 44 is engaged by the readout unit 20 while in its actuated position. Therefore, it will be appreciated that positioning of appropriate pins in their actuated position will result in the playing of the desired selections.

In order to position the pins 44 in the memory unit 18, the record selection means 16 includes an actuating unit 66 for moving the pins into their actuated position and motor means 68 comprising an electric motor 69 for setting the actuating unit 66 in the appropriate position for actuating the selected pins 44. As shown in FIG. 4 of the drawing, the actuating unit 66 is substantially contained within the memory unit housing 42 and is connected to the motor 69 by suitable drive linkage 72. The actuating unit 66 is longitudinally shiftable within the memory unit housing 42 by the motor 69 through the linkage 72 for stationing adjacent the selected pins 44 such that those pins may be placed in their actuated position by the actuating unit. Generally comprising the actuating unit 66 is a plurality of solenoids 74 extending along a line parallel to the cam track 46. Each solenoid 74 controls the position of a discrete and preselected group of the plurality of pins 44 and is shiftable within that group. Thus, individual solenoids 74 need not be provided for each pin 44 of the memory unit 18. Energization of a solenoid 74 by means of an electrical circuit results in the actuating of the pin adjacent the particular position of that solenoid within the memory unit.

When the actuating unit has been positioned within the memory unit housing 42, the solenoids 74 of the actuating unit 66 are positioned adjacent corresponding pins in each group of pins within the memory unit 18. Thus, in order to select the desired pin 44 corresponding to the record to be played, only one solenoid 74 is energized. If all the solenoids 74 within the actuating unit were energized at one time, a corresponding number of pins 44 would be simultaneously moved into their actuated position. To energize the appropriate solenoid 74, a key from one of the two groups of keys 31 or 32 on the keyboard 30 of the record selecting means 16 is chosen by the operator, which key is associated with a solenoid 74 in the actuating unit 66 to actuate the desired pin 44.

As shown in FIGS. 4, 5 and 7, each solenoid 74 for actuating the selected pins 44 in the memory unit 18 has associated therewith a plate armature 76 operatively connected to one end thereof. Upon energizing of a solenoid 74, the plate armature 76 thereof pivots about two points 78 fixed to the actuating unit 66 such that a projection 80 at the opposite end of the plate armature 76 from the fixed points 78 will contact the appropriate pin 44 and force it into its actuated position. Preferably, two projections 80 are located on each plate armature 76, the projections extending in opposing directions. As the pins 44 are respectively located along both sides of the cam track 46 and as the solenoids 74 straddle the cam track, the projections 80 also straddle the cam track and extend adjacent the respective rows of pins. Preferably, the projections are staggered longitudinally so that only one projection 80 contacts a pin at one time upon energizing of the corresponding solenoid 74. The longitudinal distance between the projections 80 of the same plate armature 76 is one-half the distance between the pins.

The motor means 68 for positioning the actuating unit 66 is controlled by a switch, such as a printed switching circuit 81, which is located adjacent the brush of the motor 69. Each of the keys of the other of the two groups of keys 31 or 32 on the keyboard 30 of the record selecting means 16 is associated with a position on the printed switching circuit 81. When one of these keys is selected, the brush of the motor 69 rotates until the selected position on the printed switching circuit 81 has been reached. This shifts the actuating unit 66 such that the selected solenoid 74 is adjacent the pin 44 to be actuated so that only pins of that designation can be actuated.

Thus, there are two groups of keys 31 and 32 on the keyboard 30—one group of keys, e.g. group 31, for shifting the actuating unit 66 by selecting the appropriate position on the printed switching circuit 81 and a second group of keys, e.g. group 32, for determining which of the solenoids 74 of the actuating unit 66 will be energized to move the adjacent pin 44 into its actuated position. A suitable matrix control system is provided for correlating the selection of the key from one of the group of keys 31 or 32 which controls the printed switching circuit 81 and the key from the other of the group 31 or 32 which chooses the appropriate solenoid 74 from the actuating unit 66 for energization. This matrix control system enables the operator to actuate the correct pin 44 corresponding to the side of the record which he has selected to be played.

The drive linkage 72 for connecting the motor 69 and the actuating unit 66 is illustrated in FIG. 4. It will be appreciated that the drive shaft 82 of the motor 69 extends outwardly therefrom through the printed switching circuit 81. Upon rotation of the brush of the motor in response to selection of a portion of the printed switching circuit 81 by a key 31 or 32, the drive shaft 82 also rotates. A crank shaft 84 is connected to the outer end of the drive shaft 82 and is formed such that its outer end moves in an eccentric pattern. At the end of the drive shaft 84 is a journal 86 which follows the path travelled by the outer end of the rotating crank shaft 84. The journal 86 moves within a journal guide 88 which comprises a generally oval-shaped track. A crank arm 90 has a bearing 92 at its outer end which is connected to the actuating unit 66. The crank arm 90 converts the eccentric movement of the journal 86 within the journal guide 88 into reciprocating movement of the bearing 92 within the memory unit housing 42. Thus, upon rotation of the drive shaft 82 of the motor 69, the journal 86 at the end of the crank shaft 84 follows an eccentric path about the journal guide 88, so that the crank arm 90 causes reciprocating movement of the actuating unit 66. As the longitudinal distance between the staggered projections 80 of each of the plate armatures 76 corresponds to one-half the distance between adjacent pins 44, the actuating unit 66 need only be moved one-half the distance between adjacent pins to actuate the next pin of the group. The actuating unit 66 preferably has at least one guide pin 94 extending outwardly and laterally therefrom. The guide pin 94 has its outer ends mounted within guide rails 96 on opposite sides of the actuating unit so that the unit is caused to travel a longitudinal path within the memory unit housing 42.

In one embodiment of the automatic phonograph 10 in accordance with the present invention, 20 keys are provided in the group of keys 31 on the keyboard 30 corresponding to an appropriate number of positions on the printed switching circuit 81 and also corresponding to groups of 20 pins 44 in the memory unit 18. Furthermore, six keys are provided in the group of keys 32 on the keyboard 30 corresponding to an appropriate number of solenoids 74 in the actuating unit 66. This allows a total of 120 selections (120 sides of 60 records) from the records contained in the magazine 12. It should be apparent, however, that any number of selections may be provided. Upon selecting one key from the first group of keys 31, the motor 69 is actuated so that the brush thereof rotates to the corresponding position on the printed switching circuit 81. Rotation of the motor shaft 82 causes the actuating unit 66 to move longitudinally within the memory unit housing 42 by means of the drive linkage 72. Thus, each of the solenoids 74 is positioned in the appropriate place within the memory unit 18 adjacent corresponding pins 44 in each of the six groups of pins. Upon selecting one key from the second group of keys 32 by the operator, the appropriate solenoid 74 is energized so that one of the projections 80 on its plate armature 76 moves a contacted pin 44 against the biasing force of the springs 52 into its actuated position adjacent the cam track 46. It should be understood that any number of keys could be employed to actuate the mechanism for storing information in the memory unit so long as a suitable matrix control system is utilized to determine the desired pins to be actuated. Any number of pins 44 may be selected by the operator and their corresponding selections played (assuming that the appropriate coinage has been placed in the coin mechanism by the operator). As will be explained in more detail below, the same selection may be chosen twice by the operator once the carriage and playing unit 14 has received the information concerning the selection to be played, even before the carriage and playing unit 14 has commenced removing that record from the record magazine 12 for play.

Once the information concerning the selections to be played is stored within the memory unit 18 by actuating the appropriate pins 44, this information is read out from the memory unit 18 by means of the readout unit 20. The spreadout unit 20 is mounted upon the carriage and playing unit 14 and is adapted to actuate an electrical circuit which causes alignment of the carriage and playing unit opposite a selected record such that the record can be removed from the record magazine 12, clamped to a turntable carried upon the carriage, played and then returned to the record magazine. As best seen in FIG. 8, the readout unit 20 includes a slide 100 adapted to move longitudinally relative to the memory unit 18. The slide 100 has a cam follower 102 mounted thereon and is movable within a cam follower housing 103. The cam follower 102 is adapted to ride upon the cam track 46 located upon the memory unit 18. In this regard, the cam follower 102 is generally pyramidal in shape so that it readily engages the toothed cam track 46. The cam follower 102 moves toward and then away from each of the pins serially as the carriage and playing unit 14 to which the slide 100 is connected moves longitudinally relative to the memory unit 18 and the record magazine 12. Operatively associated with the slide 100 is a pair of sensing levers 104 and 105. One sensing lever 104 is disposed adjacent one edge of the cam track 46 while the other sensing lever 105 is disposed adjacent the other edge of the cam track 46. At the end of each sensing lever 104 and 105 is a contact member 106. As the cam follower 102 rides along the cam track 46, the contact members 106 associated therewith move toward and then away from each of the pins 44 serially. Spacers 108 maintain the levers 104 and 105 adjacent the rows of pins 44.

The distance of movement of the cam follower 102 toward the pins 44 is such that the contact members 106 engage pins in their actuated position but do not engage pins in their non-actuated position. The contact members 106 are spaced from the non-actuated pins 44 in the memory unit 18 even as the cam follower 102 rides in the recesses 49 in the cam track 46. As shown in FIG. 5, only the right-hand pin 44, is in its actuated position, is engaged by the contact member 106, while the non-actuated left-hand pin is spaced from the contact member. When one of the contact members 106 engages a pin 44 in its actuated position, the contact member and the engaged pin comprise the terminals of an electrical circuit. This electrical circuit passes through the conducting wire 64, the lead 60, the springs 52 and the contacted pin 44 (as shown in FIG. 6) and then through the respective contact member 106 into the carriage and playing unit 14, so that the carriage is caused to be aligned with the record selection corresponding to the contacted pin 44.

Momentary engagement of one of the contact members 106 of the readout unit 20 with a pin 44 in its actuated position both completes the electrical circuit and concurrently returns the pin to its non-actuated position, thereby cancelling the record selection information in the memory unit 18 as embodied in the actuated position of that pin. The pressure applied by the contact member 106 to the outstanding surface of the pin 44 is sufficient to return the pin to its non-actuated position. As shown in FIG. 5, the actuated right-hand pin is engaged by the contact member 106 to complete the electrical circuit (as shown in solid lines). However, the contact member continues to move closer to the memory unit housing 42 after engaging the pin to return the pin to its non-actuated position (as shown in phantom lines). After the circuit has been completed, the carriage and playing unit 14 continues to move along the gear rack 40 for a short distance and halts at a position between the actuated pin and the next pin in the memory unit 18. This allows the contacted pin, which has been returned to its non-actuated position in the memory unit 18, to be reactuated if the same selection is desired to be played by the operator. Thus, the same record may be selected for replay without waiting for the playing sequence to commence.

The carriage and playing unit 14 moves along the gear rack 40 in one direction while removing records from the magazine for play until it reaches the end of the record magazine 12 and consequently the end of the gear rack 40. As the carriage and playing unit 14 moves in only one direction at a time, only one of the contact members 106 contacts the pins 44 along one side of the cam track 46 while the unit 14 moves in a particular direction. This simplifies the procedure for handling the records for play as only corresponding sides of selected records are chosen upon each pass of the unit 14. For example, only the first side of each record is played as the carriage and playing unit 14 moves toward the right along the record magazine 12 (as shown in FIG. 2) as only the sensing lever 104 is operative. When the carriage and playing unit 14 reaches the end of the record magazine 12, its direction of travel is reversed by a suitable switching device and it moves back along the magazine with the other sensing lever 105 having its contact member 106 disposed for engagement with the corresponding actuated pins 44 on the respective side of the cam track 46. Preferably, the same motor which drives the carriage and playing unit 14 along the gear rack 40 rotates the turntable of the carriage and playing unit so that the record can be played. Preferably also, a tone arm having a cartridge with needles extending in opposite directions is employed so that the appropriate needle will engage the record clamped to the turntable on the appropriate side thereof depending upon the direction of travel of the carriage and playing unit 14. It should be noted that the circuit completed between the memory and readout units does not control the direction of rotation of the turntable, which is controlled by the direction of travel of the carriage and playing unit 14.

In operation of the automatic phonograph 10 of the present invention, the operator chooses the appropriate selection keys from the groups of keys 31 and 32 of the record selection means 16 to select the desired records for play. One of the keys, typically chosen from the group of keys 31, corresponds to a position on the printed switching circuit 81 which controls rotation of the shaft 82 of the motor 69. Rotation of the motor shaft 82 causes by means of the drive linkage 72 longitudinal movement of the actuating unit 66. This positions the solenoids 74 therein adjacent corresponding pins in each group of pins. The second of the keys, which typically has been chosen from the group of keys 32, energizes the appropriate solenoid 74 in the actuating unit 66, the projection 80 on the plate armature 76 of that solenoid moving the desired pin 44 of the memory unit 18 into the actuated position. As the carriage and playing unit 14 travels along the gear rack 40 relative to the record magazine 12, the cam follower 102 of the readout unit 20 rides upon the cam track 46. One of the contact members 106 operatively associated with the cam follower 102 engages the actuated pin 44 on the respective side of the cam track, thereby completing the electrical circuit which causes termination of the movement of the carriage and playing unit 14 relative to the magazine 12. Subsequently, the desired record is selected from the magazine, clamped to the turntable, played, and returned to the magazine. The carriage and playing unit 14 then commences further travel along the gear rack 40 until the next pin 44 in its actuated position is reached. When the carriage and playing unit 14 reaches the end of the gear rack 40, its direction of travel is reversed and the other of the contact members 106 is adapted to engage any actuated pins 44 in the memory unit 18 along the respective side of the cam track 46 to commence the playing of a selected record.

Thus, an automatic phonograph has been provided with improved memory and readout units. The memory and readout units of the present automatic phonograph are relatively simple in operation and do not require an extensive number of electrical and electromagnetic elements. Moreover, the present automatic phonograph allows for the choosing of a selected record by matrix control and then reselecting of the same record as soon as selection of the record from the magazine has commenced.

While one specific form of the invention has been shown and described, it should be apparent that various modifications could be made within the automatic phonograph without departing from the spirit and scope of the invention. For example, a magnetic switch mechanism could be provided for controlling the motor means 68 in response to manipulation of a key of the record selection means 16 rather than providing a printed switching circuit 81.

Various of the features are set forth in the following claims.

What is claimed is:

1. In an automatic phonograph including a record magazine adapted to hold a plurality of records in an upright position along a horizontal axis, a carriage mounted for horizontal movement relative to the record magazine and having means for removing an individual record from the magazine, clamping the record to a turntable, playing the record, and returning the record to the magazine, and record selection means enabling the operator to select a side of a particular record for playing thereof, means for storing and reading out information from the record selection means comprising, in combination, a memory unit, a readout unit, and circuit means actuable by said readout unit to align the carriage opposite a selected record, said memory unit comprising a housing, a plurality of pins disposed in said housing, and a cam track, each of said pins corresponding to one side of a particular record and being movable from a non-actuated position to an actuated position in response to a signal from the record selection means, said readout unit being disposed on the carriage and comprising a cam follower adapted to follow said cam track and a contact member operatively associated with said cam follower which, upon movement of the carriage relative to the cam track, is moved toward and then away from each of said pins serially whereby said contact member engages a pin in said actuated position but does not engage a pin in said non-actuated position, said contact member and each of said pins comprising the terminals of said circuit so that engagement of said contact member with a pin in said actuated position aligns the carriage with the record corresponding to said pin in said actuated position.

2. An automatic phonograph according to claim 1 wherein engagement of said contact member with a pin in said actuated position concurrently returns said pin to its non-actuated position, thereby cancelling the record selection information in said memory unit corresponding to said pin.

3. An automatic phonograph according to claim 1 wherein the distance of movement of said cam follower toward said pins is such that said contact member engages a pin in said actuated position to complete said circuit but does not engage a pin in said non-actuated position.

4. An automatic phonograph according to claim 1 wherein said plurality of pins extend along the length of said memory unit housing in staggered relationship and said cam track extends between pairs of pins corresponding to the two sides of each record contained in said record magazine.

5. An automatic phonograph according to claim 1 wherein said cam track comprises a toothed rack and said cam follower is adapted to ride upon said toothed rack upon movement of said carriage relative to said magazine such that said contact member is normally spaced from said non-actuated pins.

6. An automatic phonograph according to claim 1 wherein said memory unit housing is relatively elongated and further comprising yieldable means extending longitudinally within a recess in said memory unit housing and within corresponding grooves in said pins for normally biasing said pins into their non-actuated position but permitting said pins to move into their actuated position.

7. An automatic phonograph according to claim 1 wherein said record selection means comprises an actuating unit longitudinally shiftable within said memory unit housing for moving the selected ones of said pins into their actuated position.

8. An automatic phonograph according to claim 7 wherein said actuating unit comprises a plurality of solenoids, each said solenoid controlling the position of a discrete and preselected group of said plurality of pins, each said solenoid having an armature adapted to pivot upon energizing of that solenoid to engage a selected one of said pins and move it into its actuated position.

9. An automatic phonograph according to claim 8 wherein said armature of each said solenoid has a pair of projections extending laterally outwardly therefrom on either side thereof and being staggered longitudinally of said actuating unit so that only one said pin corresponding to one side of a record selected is moved into its actuated position by said armature of said energized solenoid.

10. An automatic phonograph according to claim 7 wherein said record selection means further comprises a guide member, a crank movable within said guide member and connected to said actuating unit and motor means energized by said record selection means for rotating said crank, whereby upon energizing said motor means, said crank moves within said guide member and said actuating unit shifts longitudinally within said memory unit housing.

11. An automatic phonograph according to claim 10 wherein said motor means comprises switching circuit means having portions adapted for selection, and a shaft extending from said motor means and connected to said crank, whereby upon rotation of said shaft to a position corresponding to a selected portion of said switching circuit means, said crank moves within said guide member and said actuating unit shifts within said memory unit housing.

12. An automatic phonograph according to claim 1 wherein said carriage is adapted to travel continuously in one direction relative to said magazine until said carriage reaches the end of said magazine, whereupon the direction is reversed and said carriage moves back along said magazine.

13. An automatic phonograph according to claim 1 wherein said carriage is adapted to move slightly beyond the contacted pin in said actuated position upon engagement of said pin so that said pin can be reactuated while the selected record is playing.

* * * * *